(12) United States Patent
Andres et al.

(10) Patent No.: US 11,416,521 B2
(45) Date of Patent: Aug. 16, 2022

(54) DATA ITEM CLASSIFICATION AND ORGANIZATION IN LARGE DATA SETS

(71) Applicant: jSonar Inc., San Mateo, CA (US)

(72) Inventors: Joey Andres, Lexington, MA (US); Ron Ben-Natan, Lexington, MA (US); Uri Hershenhorn, Lexington, MA (US); Dan Nguyen, Lexington, MA (US); Ury Segal, Vancouver (CA); Luigi Labigalini, Lexington, MA (US); Ishai Kones, Lexington, MA (US)

(73) Assignee: jSonar Inc., San Mateo, CA (US)

( * ) Notice: Subject to any disclaimer, the term of this patent is extended or adjusted under 35 U.S.C. 154(b) by 276 days.

(21) Appl. No.: 16/738,975

(22) Filed: Jan. 9, 2020

(65) Prior Publication Data
US 2022/0035839 A1    Feb. 3, 2022

(51) Int. Cl.
*G06F 7/00* (2006.01)
*G06F 16/28* (2019.01)
*G06N 5/04* (2006.01)
*G06Q 50/26* (2012.01)
*G06F 21/62* (2013.01)

(52) U.S. Cl.
CPC ........ *G06F 16/285* (2019.01); *G06F 21/6254* (2013.01); *G06N 5/04* (2013.01); *G06Q 50/265* (2013.01)

(58) Field of Classification Search
CPC ..... G06F 16/285; G06F 21/6254; G06N 5/04; G06Q 50/265
USPC ......................................... 707/600–899, 737
See application file for complete search history.

(56) References Cited

U.S. PATENT DOCUMENTS

2019/0332962 A1* 10/2019 Harvey ................. G06F 16/285

* cited by examiner

*Primary Examiner* — Isaac M Woo
(74) *Attorney, Agent, or Firm* — Womble Bond Dickinson (US) LLP

(57) ABSTRACT

Classification for data intake operations in an enterprise ensures that sensitive data is not disseminated inappropriately, but incurs substantial time, effort and expense. A method of classifying data in a large set of data repositories captures a set of raw rules resulting from inputs indicative of evaluations and conclusions of data classification operations, typically by logging data classification operations, and identifies patterns in the set of raw rules by consolidating duplicative conditions and eliminating inconsequential conditions. External conditions and observations may be referenced for applying a context to the rules based on a usage or domain of the data, and data sets of disparate entities may be examined for anonymizing the data and combining with other sets of anonymized data.

20 Claims, 7 Drawing Sheets

DATA ITEM CLASSIFICATION AND ORGANIZATION IN LARGE DATA SETS

BACKGROUND

As the modern trend favoring electronic transactions continues to replace increasing numbers of paper and face-to-face transactions, data storage needs for the information exchanged in these transactions also continues to increase. Vast quantities of data are stored in databases accessible via a public access network such as the Internet, including so-called "cloud stores" operated by corporate entities such as AMAZON®, GOOGLE® and MICROSOFT®, but also in smaller scale and local/private collections as well. This data includes private and confidential information, and there is an increasing burden on the keepers of sensitive data to maintain it in a secure manner. Data often needs to be classified or tagged with a label to indicate a sensitive or private nature to ensure appropriate handling and safeguarding. Such classification activities can impose a formidable task.

SUMMARY

A method of classifying data in a large set of data repositories includes capturing a set of raw rules resulting from inputs indicative of evaluations and conclusions of data classification operations, and identifying patterns in the set of raw rules by consolidating duplicative conditions and eliminating inconsequential conditions. Data classification for privacy and security concerns is often a repetitive process based on examination of data field labels and/or values for indicators that the data item is sensitive or private. Once an operation, such as a set of keystrokes or conditional expression is performed repetitively, recognition and playback of that operation as a repeatable rule may facilitate future efforts. Further, a number of recognized, repeated operations may yield a generalized rule that simplifies multiple repeatable rules by consolidating repeated data field names or labels, and eliminating inconsequential ones that do not affect the resulting conclusion, output or action. For example, a field label denoting a social security number is likely sensitive regardless of the value that follows. Additional efficiencies can be obtained by recognizing a context of the data to apply the rules based on a usage or domain of the data, such as a node name that denotes either a retirement account storage (likely sensitive) or one that denotes advertising and promotional materials (likely not proprietary). The context may lead to a general trend among different data sets and entities, such as an employee identifier that has slightly different mnemonics across different corporations, but if anonymized to remove corporation (owner) specific aspects, provides general guidance for employee information in most corporate data sets. This may involve anonymizing the data and combining with other sets of anonymized data.

Configurations herein are based, in part, on the observation that increasing quantities of sensitive and private data are stored in electronic databases. Unfortunately, conventional approaches to data storage and security suffer from the shortcoming that substantial effort is required to accurately classify and tag, or take other actions, for ensuring proper handling of the sensitive information. Further, improper classification can result in inappropriate dissemination of sensitive information, or make legitimately available information more difficult to access. Accordingly, configurations herein substantially overcome the above described shortcomings by providing a data classification approach that stores and analyzes patterns in data classification operations for applying the patterns to additional data items. Repeated sequences are captured and analyzed to derive rules for classifying the data items by identifying attributes or values that tend to denote sensitive data. Outside context information is applied to identify real-world entities and labels that may have a bearing on the data sensitivity, Finally, certain observed data is anonymized or redacted to compute a general rule agnostic to the redacted values that may be applied across a large number of data sets.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below implement a data classification approach that derives general classifications and resulting actions based on recording and analyzing manual classification operations by refining deterministic details and filtering out insignificant details used for classifying data items. An example platform and several illustrative classification use cases are demonstrated, however it will be apparent that others may be applied.

Figure 1:
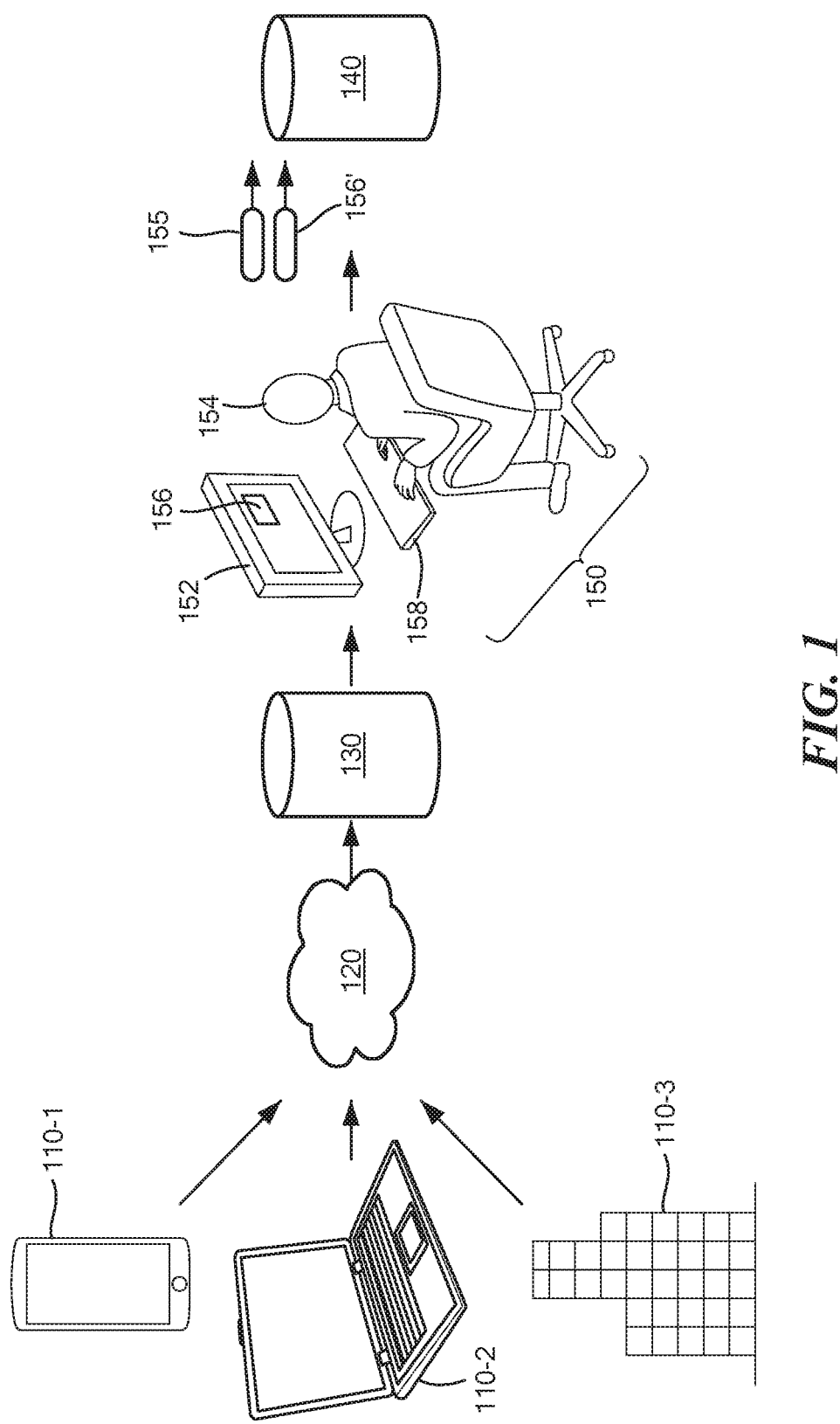
FIG. 1 is a context diagram of a data classification and storage environment suitable for practicing configurations disclosed herein.

FIG. 1 is a context diagram of a data classification and storage environment suitable for practicing configurations disclosed herein. Referring to FIG. 1, in the data classification and storage environment, various data sources such as personal device 110-1, personal computers 110-2, and businesses 110-3 (110 generally) generate data that is transported via a public access network 120 such as the Internet destined for unscrutinized or unevaluated data repositories storing one or more data sets 130 received through a network interface.

While not all data may be stored in a designated "unevaluated" database, a significance lies in whether the classification and privacy/security designation has occurred. A data classification operation 150 often commences with a on screen interface, typically a Graphical User Interface (GUI) 152 responsive to an evaluator 154 for reviewing a data item 156 rendered on the GUI 152 for performing a conclusion such as a privacy tag or action using an input device 158. The resulting action, typically tagging the data with a security or privacy attribute, is stored in a tagged or classified data repository 140 (which may be the same physical storage location with an appended tag, for example).

Figure 2:
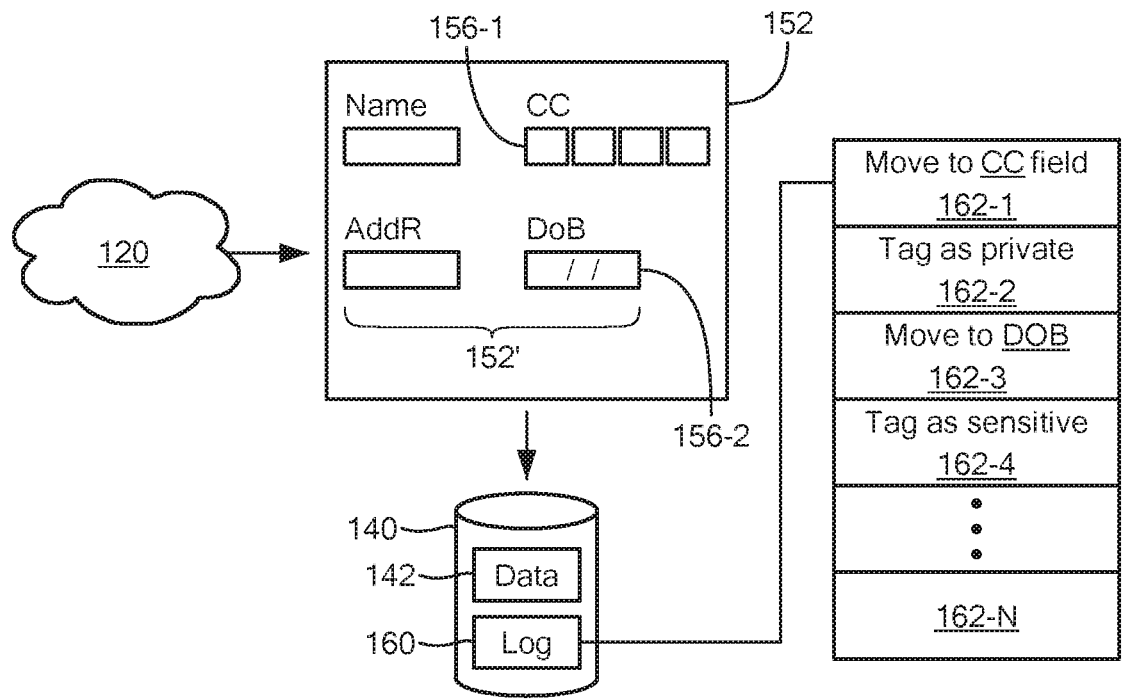
FIG. 2 is shows logging of data classification operations in the environment of FIG. 1.

FIG. 2 is shows logging of data classification operations in the environment of FIG. 1. Referring to FIGS. 1 and 2, incoming data emanates from a network 120 source into a local repository 130. During a classification operation 150 to identify and/or designate sensitive data, the GUI 152 renders the data items 156-1 . . . 156-2 (156 generally) for classification, and receives a disposition 155 indicative of a successive handling action of the qualified data item 156'. The action would typically tag the data with an indication of a sensitive aspect (or lack thereof), but may involve other actions such as to defer security classification, delete the item outright, or to ignore the data item.

For example, data item 156-1 is a credit card number having a field label of "CC." The data classification operation may look for a field label of "CC #" or "Credit Card," or may look for a sequence of 4 sets of 4 digits denoting a 16 digit field (or 15 with some credit cards). Alternatively, the data value itself may be interrogated, as the first 4 digits of a credit card number typically denotes the issuer and other information.

Similarly, data item 156-2 is a date of birth labeled "DOB." Classification operations may look to this mnemonic, or may look to a format "MM/DD/YY" or similar. In either case, a conclusion 155 is received for indicating subsequent action for the data item. The log 160 stores the activity undertaken for classifying the data items 156, and generally includes a series of entries 162-1 . . . 162-N (162 generally) tracking keystrokes, entries and/or other dispositions that refer to the data items 156. The processed data items 156' resulting from the classification operations are stored in the processed or classified data repository 140, along with any designation of security such as a tag.

Most data items 156 occur in a series of data entries 152,' often referred to as records, which often appear together. For example, in a data set 130 under scrutiny, the same or similar data items 156 are likely to recur in successive data entries from a data set, collection or table. The GUI 152 will likely render a series of entries each having the same credit card and DOB field labels. Accordingly, the classification operations involve a similar sequence of comparisons and action. The keystrokes or other inputs are stored in a log 160.

The classification steps may commence as a manual data entry action based on a predetermined instruction. Once a sufficient number of evaluations and conclusions are established, the classification may be codified or automated. In the example above, the log would indicate that entries labeled "CC" resulted in the tag of "sensitive." A resulting conditional expression would appear as If field_name="CC" then security_tag="PRIVATE," or similar logic. The log 160 contains a set of the classification steps in the order 162-1 . . . 162-4.

Figure 3:
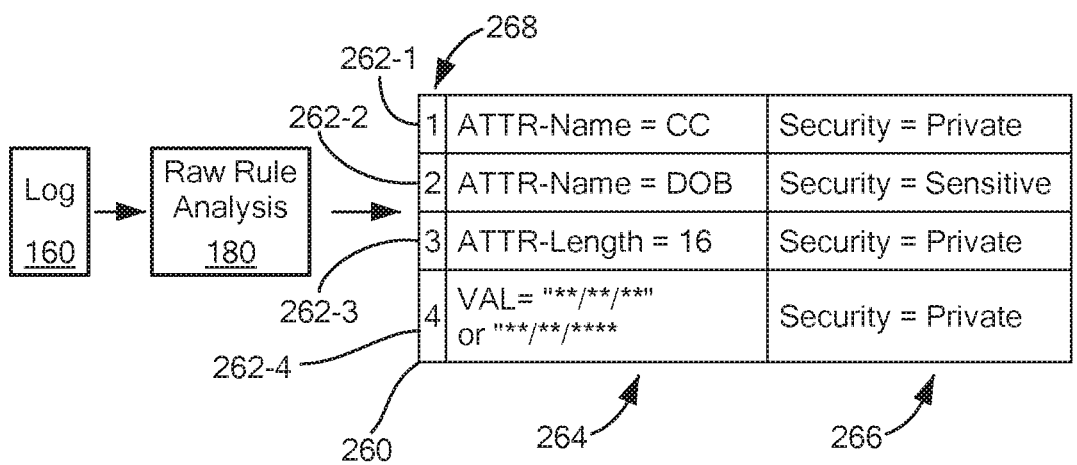
FIG. 3 shows generation of rules from the logged data classification operations of FIG. 2.

FIG. 3 shows generation of rules from the logged data classification operations of FIG. 2. Referring to FIGS. 1-3, the recorded classification steps from the entries 162 evolve into conditional expressions including at least a field and a value for resulting in the conclusion or action. Once the classification steps are defined in terms of an evaluation and conclusion, they may be defined in a table 260 of raw rules for classifying data, and/or replayed for performing the same classification operations on other data sets. The table 260 denotes raw rules that may be replayed for classifying other entries when a recurring number and form of entries is encountered. The raw rules are defined from the recorded qualitative evaluations of data content performed through the user interface 152 and stored in the log 160 above. In order to allow definition as a rule, the recorded qualitative evaluations include a field and a valuation for that field resulting in a conclusion of data sensitivity. The analyzed raw rules are expressed as a table of entries 262-1 . . . 222-4 in the example shown.

The sequence of the classification steps received and stored in the log 160 undergo raw rule analysis 180 therefore employed to form the table 260 of rules 262-1 . . . 262-N (262 generally) based on classification steps received, including evaluations 264 and conclusions 266 performed. The evaluations 264 generally include conditional expressions applied to one or more of the data items 156 in the data entry, such as "data field name=CC" in the example above. A conclusion 266 is associated with an action or disposition of the data item based on the conditional expressions, such as tagging the credit card number as "private" or the date of birth/age as "sensitive." Since credit card #s may be used directly to incur monetary exchanges, these are a greater risk than age. Various levels of security may be applied by the action. The discussion herein employs "private" and "sensitive" as available tags.

From the raw rules defined in the table 260, an ordering 268 or priority may be applied to designate which rules 262 trigger first. This results in the table 260 including an ordered list of rules based on the raw rules, such that each rule of the list of rules includes the conditional expression (evaluations 264) based on at least one parameter and an action (conclusion 266) associated with the conditional expression.

Figure 4:
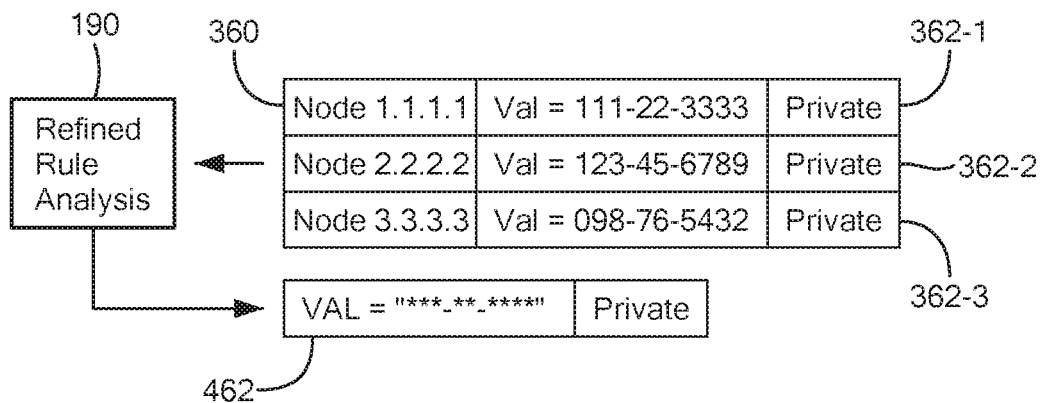
FIG. 4 shows consolidation and generalization of the raw rules of FIG. 3.

FIG. 4 shows consolidation and generalization of the raw rules of FIG. 3. Referring to FIGS. 1-4, as a table 260 is generated, patterns and repeated occurrences of data items 156 may occur, as well as insignificant data items that do not affect the resulting action. A refined rule analysis 190 occurs to identify a parameter or parameter value occurring in a plurality of the rules 262 in the filter table 260. The refined rule analysis 190 generates consolidated, or "smart" rules that consolidate duplicative conditions and eliminate inconsequential conditions. For example, a table 360 of rules includes entries 362-1 . . . 362-3 (362 generally). The refined rule analysis 190 computes a general rule 462 based on the plurality of the rules 362 in the list of rules having the identified parameter or parameter value occurring in each rule of the plurality of the rules 362. Each of the entries 362-1 . . . 362-3 has a value (Val) corresponding to a social security number, recognizable by the form of 3 digits, 2 digits and 4 digits separated by a hyphen. A node field designates an origination of the data. The refined rule analysis 190 determines that the node value is insignificant in the conclusion that the data is private. The analysis 190 also identifies a format of the data that is independent of the value of the digits therein. The resulting consolidated, or "smart" rule 462, assigns a designation of "private" to a data value having the form "xxx-xx-xxxx" as likely representing a social security number.

Figure 5:
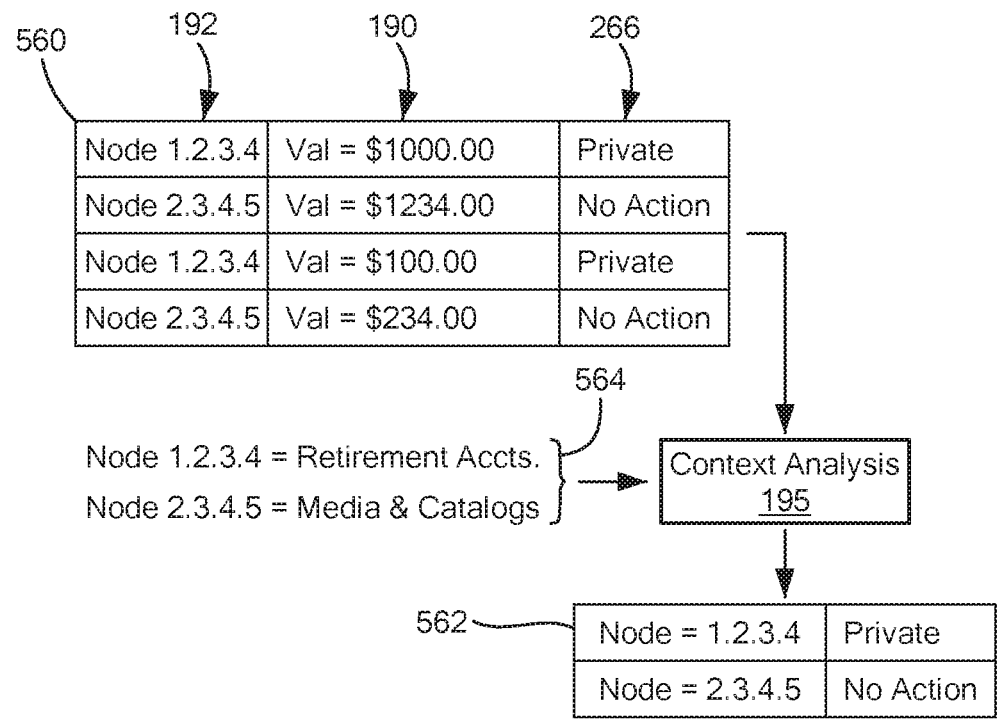
FIG. 5 shows analysis and modification of the generalized rules to recognize an outside context of values and fields.

FIG. 5 shows analysis and modification of the generalized rules to recognize an outside context of values and fields. Certain conditions or external facts not inherent in the data may also contribute to a context. Identifying the context includes associating a parameter from the identified pattern with an external entity or fact, in which the external entity or fact is defined by sources outside the rule list and data set from which the data items emanated. For example, a table 560 denotes data items 190 for monetary amounts. An originating node 192 is also given, along with the conclusions 266 of the data items concerned. A data content analysis might result in a rule concerning all monetary values, and the value of the originating node 192 alone does not lend any refinement. If a context 564 of the respective nodes is considered, it is noted that node 1.2.3.4 handles retirement accounts, and likely contains sensitive amounts, justifying a conclusion of private. Conversely, node 2.3.4.5 handles media and catalog data, and the monetary amounts are likely published prices and public domain items about product offerings. A privacy conclusion of "no action" is therefore appropriate for data corresponding to node 2.3.4.5 based on the injected context.

Extending this analysis to multiple enterprises can result in a general rule set applicable to multiple corporations. For example, this might include identifying data sets of other entities affected by the external entity or fact. Investment corporations in general will have data stores of retirement accounts. More generally, most corporations will have data stores and/or servers dealing with sensitive financial information, such as employee payroll. Anonymizing the data classification operation can be performed to remove a specific reference to the external entity or fact, such as a corporation name or employee group. Applying the anonymized data classification operation to other data sets can result in a general rule for "proprietary financials," rather than "company xyz pension fund" or "company abc compensation."

Figure 6A:
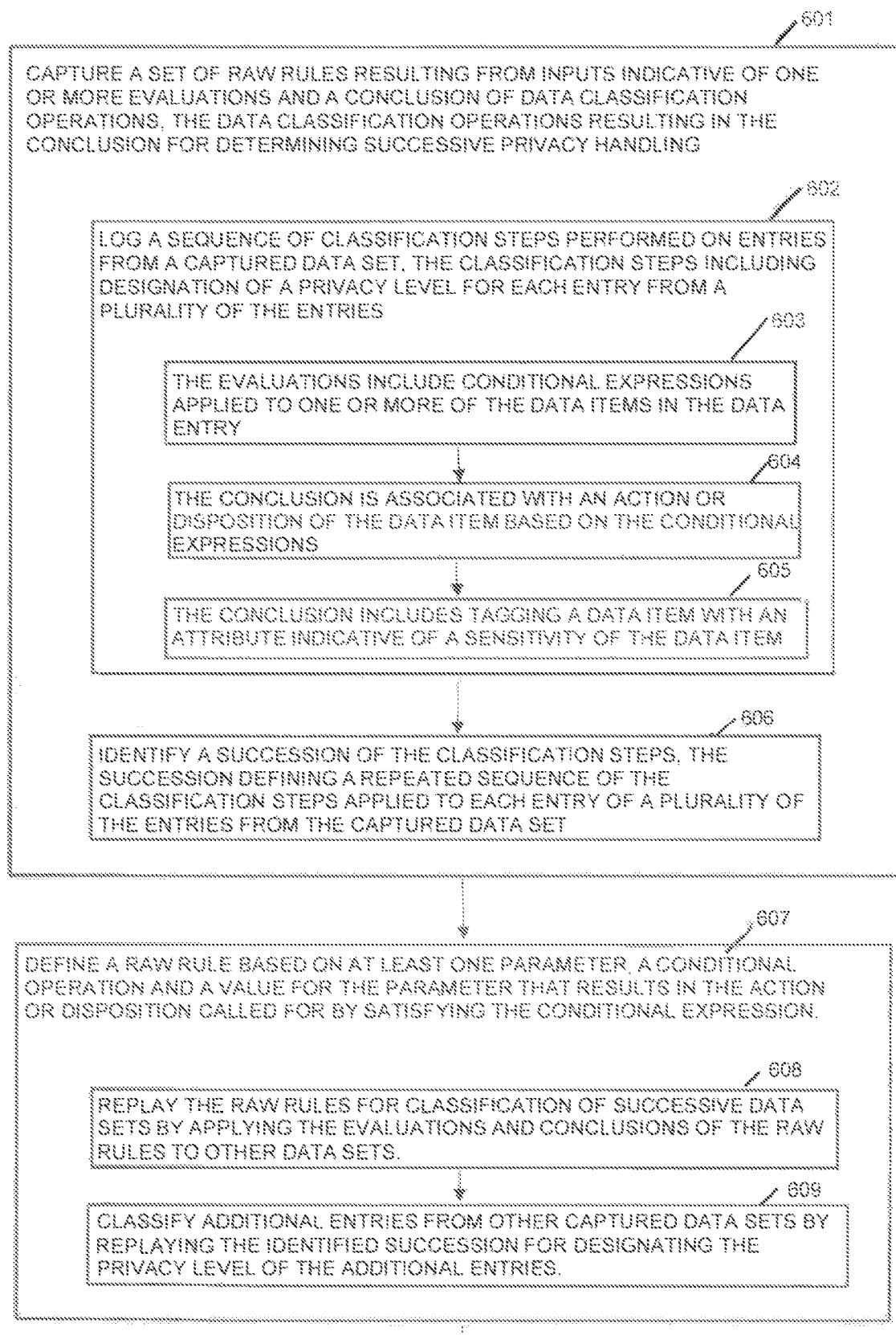
FIGS. 6A-6C show a flowchart of data classification using the approach of FIGS. 2-5.
Figure 6B:
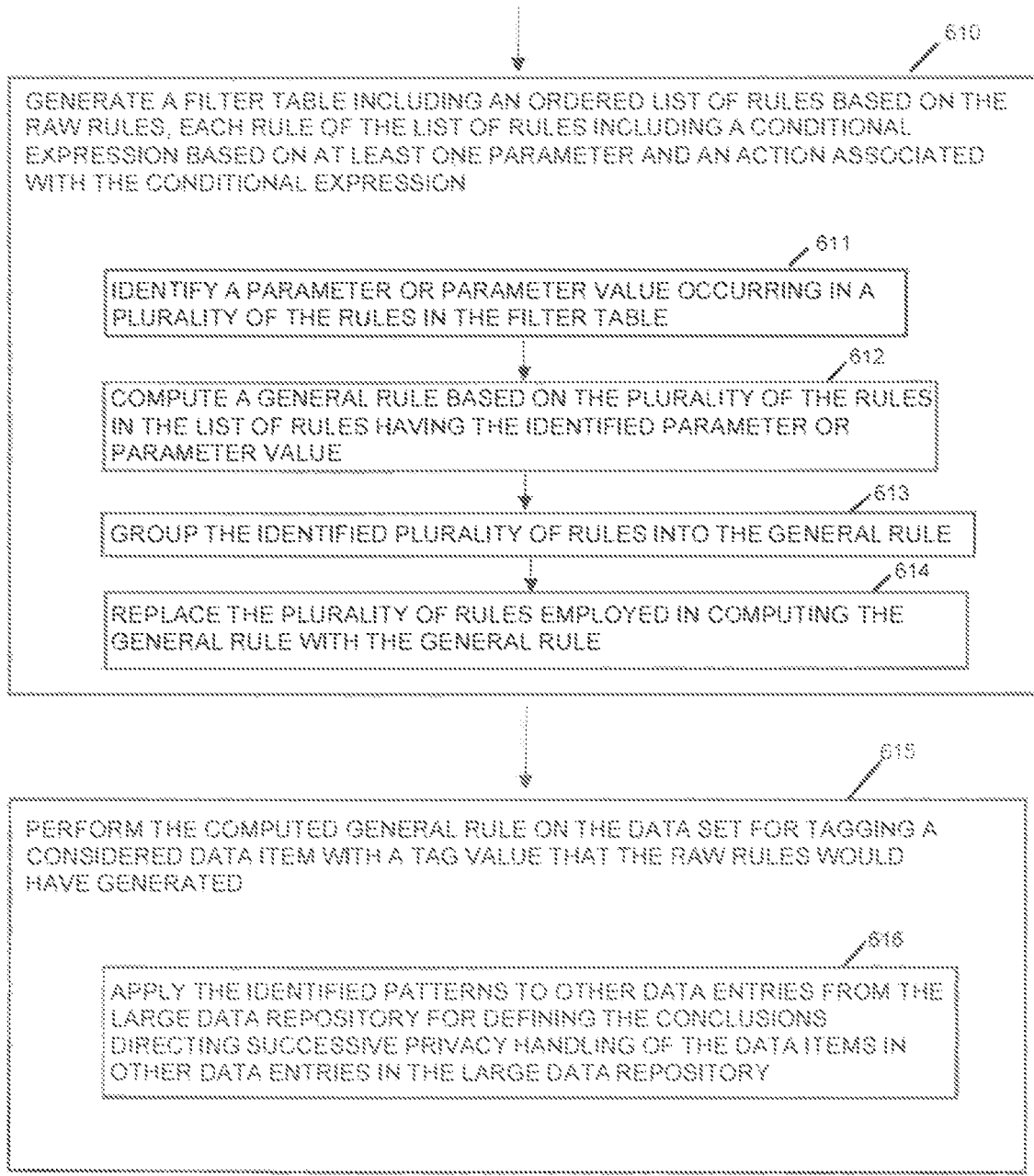
Figure 6C:
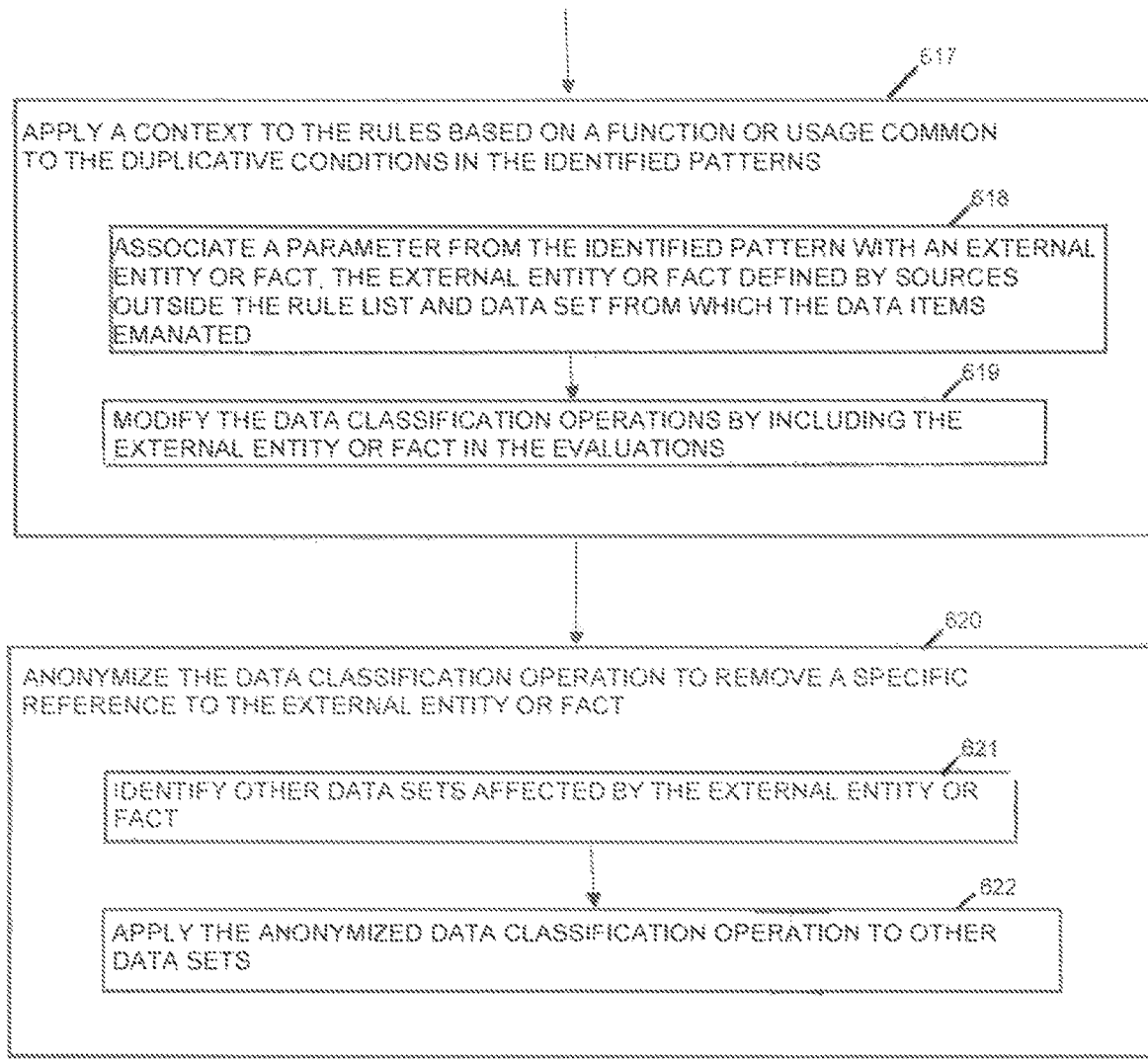

FIGS. 6A-6C show a flowchart of data classification using the approach of FIGS. 2-5. Referring to FIGS. 1-6C, in the data repository for storing large data sets having a plurality of data entries each including at least one data item, the method of classifying and tagging data in the data set as disclosed herein includes, at step 601, capturing a set of raw rules 260 resulting from inputs indicative of one or more evaluations and a conclusion of data classification operations. The data classification operations result in the conclusion for determining successive privacy handling. Capturing the set of raw rules 262 further includes logging a sequence of classification steps performed on entries from a captured data set 130, as depicted at step 602. The classification steps include designation of a privacy level, security designation, action or other conclusion 155 for each entry 156 from a plurality of the entries. Each entry depicts a data item from the incoming, unchecked data. The evaluations typically include conditional expressions applied to one or more of the data items in the data entry, as shown at step 603, and the conclusion is associated with an action or disposition of the data item based on the conditional expressions, as depicted at step 604. The conclusion includes tagging a data item 156 with an attribute, such that the attribute is indicative of a sensitivity of the data item 156, as disclosed at step 605, and may involve a selection from an on-screen menu or an action or disposition based on a rule as disclosed below.

During the logging, a succession of the classification steps is identified, such that the succession defines a repeated sequence of the classification steps applied to each entry of a plurality of the entries from the captured data set, as depicted at step 606. For example, it is likely that a number of similar records, documents or structs will appear in the captured data set 130. Each of these entries will likely have a similar appearance on the GUI 152, and will incur the same or similar classification steps. Identification of these classification steps taken for each record or document denotes a sequence that may be repeated for other similar records or documents.

Based on the classification steps, a raw rule may be derived from one or more parameters, a conditional operation and a value for the parameter that results in the action or disposition called for by satisfying the conditional expression, as disclosed at step 607. The raw rule may denote classification steps that denote a credit card number based on the field name or appearance, and tag that data item as "private." The raw rules or log 160 may be replayed for classification of successive data sets by applying the evaluations and conclusions of the raw rules to other data sets, as shown at step 608. The raw rules or log are invoked for classifying additional entries from other captured data sets by replaying the identified succession for designating the privacy level of the additional entries, as depicted at step 609. This repeats the previously established sequence of classification steps when a series of entries has similar data items resulting in similar conclusions or actions.

The raw rule analysis 180 processes the log 160 for generating a filter table 260 including an ordered list of rules based on the raw rules, such that each rule of the list of rules includes a conditional expression 264 based on at least one parameter and an action or conclusion 266 associated with the conditional expression, as disclosed at step 610. The raw rules of tables 260 and 360 depict the type of conditional expression logic that occurs in tagging or classifying data. A voluminous body of logic may be accumulated from merely mirroring the logic applied, because the same logic is often applied repetitively. It would be beneficial to identify patterns in the set of raw rules by consolidating duplicative conditions and eliminating inconsequential conditions to avoid reapplying the same conditional expression or logic.

Refined rule analysis 190 identifies a parameter or parameter value occurring in a plurality of the rules in the table 360, as shown at step 611, and computes a general rule based on the plurality of the rules in the list of rules having the identified parameter or parameter value occurring in each rule, as depicted at step 612. Table 360 denotes an inconsequential node name and hones in on the form, rather than the value, of a social security number for tagging as a sensitive data item.

At step 613, the refined rule analysis groups the identified plurality of rules into a general rule 462. The general rule may replace the plurality of rules employed in computing the general rule with the general rule, as depicted at step 614, such as the general rule 462 replacing each of entries 362-1 . . . 362-3.

The general rule 462 may now be invoked on the data set 130 for tagging a considered data item 156 with a tag value that the raw rules would have generated, as shown at step 615. Iteration of the general rules may then be used to apply the identified patterns to other data entries 156 from the large data repository for defining the conclusions directing successive privacy handling of the data items in other data entries 156 in the large data repository, as stated at step 616, thus codifying a compact set of refined rules rather than repetitive manual classification or log file replaying.

At step 617, context analysis applies a context to the rules based on a function or usage common to the duplicative conditions in the identified patterns. Generating the context includes associating a parameter from the identified patterns or rules with an external entity or fact, the external entity or fact defined by sources outside the rule list and data set from which the data items emanated, as depicted at step 618. This may include, for example, qualifying a general nature of a server or source of the data as in FIG. 5. The context analysis may modify the data classification operations by including the external entity or fact in the evaluations, as shown at step 619.

A further extension includes anonymizing the data classification operation to remove a specific reference to the external entity or fact, as depicted at step 620. Many different entities have similar business processes and data gathering practices, however may employ different labels, keywords and/or involve proprietary information in the data. Removal or redaction of proprietary data, and normalizing the data by the function it is used for (e.g. payroll, sales data, promotional materials) can be employed to identify other data sets affected by the external entity or fact at a larger or more abstract scope, such as across multiple enterprises or corporations, as disclosed at step 621. The anonymized data classification operation can then be applied to other data sets, as depicted at step 622, to benefit different organizations from the classification and tagging logic obtained from other entities.

Figure 7:
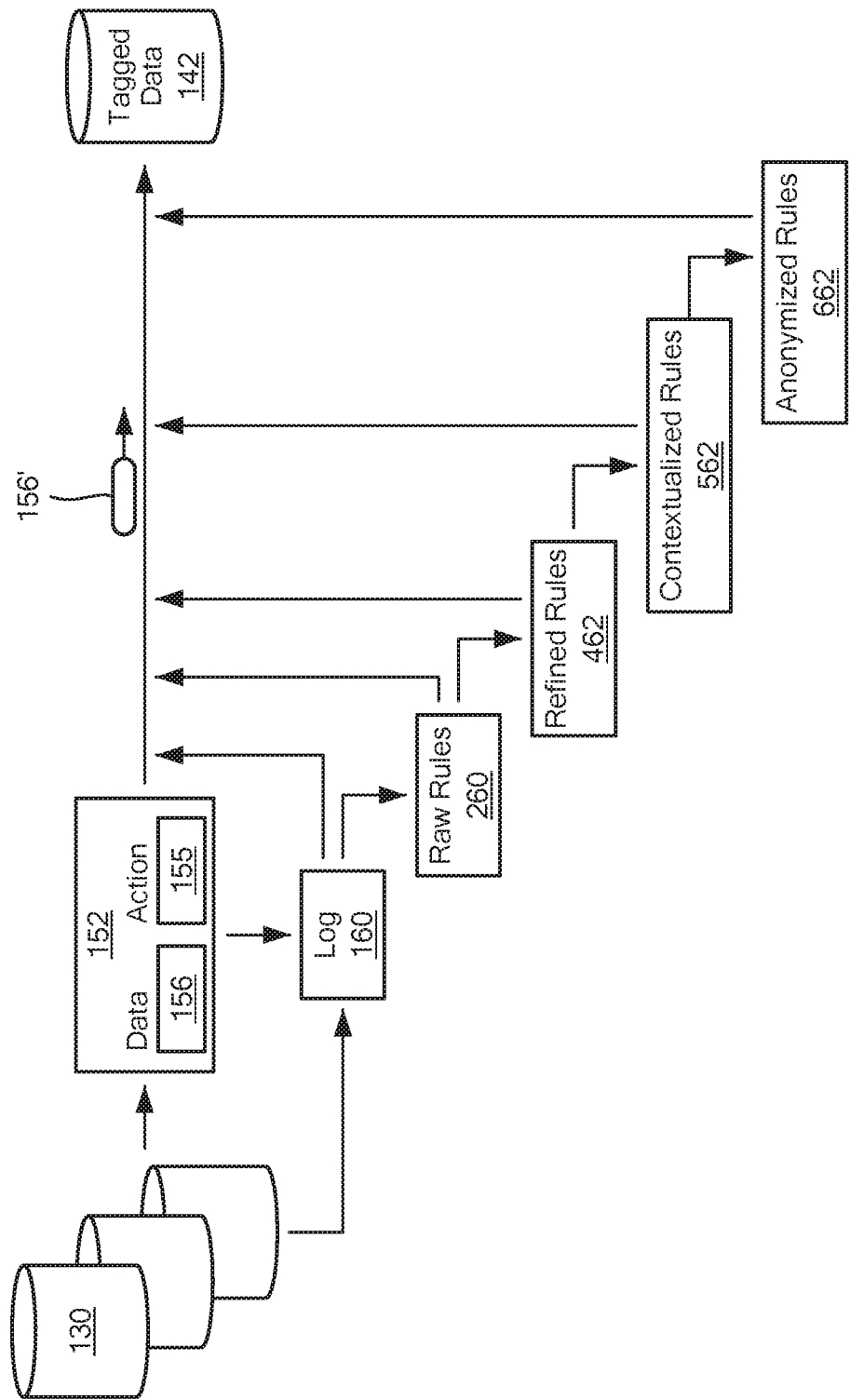
FIG. 7 shows a progression of the data classification operations based on the flowchart of FIGS. 6A-6C.

FIG. 7 shows a progression of the data classification operations based on the flowchart of FIGS. 6A-6C. The above analysis is applicable in a cascading or narrowing approach that strives to narrow a large set of gathered data classification operations into a small but robust analysis process. Referring to FIGS. 1-7, data sets 130 reside in various repositories, typically invoked via network access, and containing a variety of date items that may impose a burden to safeguard or keep secure from general public access or dissemination. A data classification procedure typically commences as a manual operation for identifying a data item 156, and defining a conclusion 155 or action to indicate successive treatment, such as whether the data item 156 needs to be treated as private or sensitive. Once classified, typically by tagging with a value, flag or indicator, the tagged data item 156' may be stored in a scrutinized data repository where appropriate designations and safeguards are applied.

The configurations above extend this process by leveraging and refining the classification operations to automate and expedite the classification operations for storing the tagged data item 156'. A log 160 of the classification operations may allow replay of previous classifications for similarly arranged data, as depicted in FIG. 2. Raw rules 260 may be generated based on observation of conditions upon which the conclusion 155 for data classification is applied, as shown in FIG. 3. The raw rules may be consolidated for common conditions and redundancy elimination into refined, or "smart" rules 462, as discussed in FIG. 4. Contextual information augments the refined rules 462 to generate contextualized rules, depicted in FIG. 5. Anonymization for general applicability of the rules outside of a particular corporation or enterprise is used to produce anonymized rules 662. Successive agglomeration of the rule logic serves to produce a classification logic at each successively broadened level to facilitate the intake of data sets 130 into appropriately classified data items 156'

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a data repository for storing large data sets having a plurality of data entries each including at least one data item, a method of classifying data in the data set, comprising:
   capturing a set of raw rules based on one or more evaluations of data classification operations and a conclusion for each of the one or more evaluations, and wherein each of the set of raw rules comprises an evaluation of the one or more evaluations for a particular data item and a corresponding conclusion for determining successive privacy handling of the particular data item;
   identifying at least one pattern in the set of raw rules by consolidating duplicative conditions and eliminating inconsequential conditions; and
   applying the identified patterns to other data entries from the large data repository for defining the conclusions directing successive privacy handling of the data items in other data entries in the large data repository.

2. The method of claim 1 further comprising applying a context to the rules based on a function or usage common to the duplicative conditions in the identified patterns.

3. The method of claim 2 wherein generating the context includes associating a parameter from the identified pattern with an external entity or fact, the external entity or fact defined by sources outside the rule list and data set from which the data items emanated; and
   modifying the data classification operations by including the external entity or fact in the evaluations.

4. The method of claim 3 further comprising identifying other data sets affected by the external entity or fact;
   anonymizing the data classification operation to remove a specific reference to the external entity or fact; and
   applying the anonymized data classification operation to other data sets.

5. The method of claim 1 wherein capturing the set of raw rules further includes:
   logging a sequence of classification steps performed on entries from a captured data set, the classification steps including designation of a privacy level for each entry from a plurality of the entries; and
   identifying a succession of the classification steps, the succession defining a repeated sequence of the classification steps applied to each entry of a plurality of the entries from the captured data set.

6. The method of claim 5 further comprising classifying additional entries from other captured data sets by replaying the identified succession for designating the privacy level of the additional entries.

7. The method of claim 1 wherein:
   the evaluations include conditional expressions applied to one or more of the data items in the data entry; and
   the conclusion is associated with an action or disposition of the data item based on the conditional expressions, further comprising:
   defining a raw rule based on at least one parameter, a conditional operation and a value for the parameter that results in the action or disposition called for by satisfying the conditional expression.

8. The method of claim 7 wherein the conclusion includes tagging a data item with an attribute, the attribute indicative of a sensitivity of the data item.

9. The method of claim 1 further comprising replaying the raw rules for classification of successive data sets by applying the evaluations and conclusions of the raw rules to other data sets.

10. The method of claim 1 further comprising generating a filter table including an ordered list of rules based on the raw rules, each rule of the list of rules including a conditional expression based on at least one parameter and an action associated with the conditional expression.

11. The method of claim 10 further comprising:
identifying a parameter or parameter value occurring in a plurality of the rules in the filter table; and
computing a general rule based on the plurality of the rules in the list of rules having the identified parameter or parameter value occurring in each rule of the plurality of the rules.

12. The method of claim 11 further comprising performing the computed general rule on the data set for tagging a considered data item with a tag value that the raw rules would have generated.

13. The method of claim 11 further comprising:
grouping the identified plurality of rules into the general rule; and
replacing the plurality of rules employed in computing the general rule with the general rule.

14. A data intake device for storing large data sets having a plurality of data entries each including at least one data item for classification, comprising:
a network interface to a data set for classification;
a log for capturing a set of raw rules based on one or more evaluations of data classification operations and a conclusion for each of the one or more evaluations, and wherein each of the set of raw rules comprises an evaluation of the one or more evaluations for a particular data item and a corresponding conclusion for determining successive privacy handling of the particular data item;
a rule analysis process for identifying at least one pattern in the set of raw rules by consolidating duplicative conditions and eliminating inconsequential conditions; and
a rule table for applying the identified patterns to other data entries from the large data repository for defining the conclusions directing successive privacy handling of the data items in other data entries in the large data repository.

15. The device of claim 14 wherein
the log includes a sequence of classification steps performed on entries from a captured data set, the classification steps including designation of a privacy level for each entry from a plurality of the entries, and
the log includes a succession of the classification steps, the succession defining a repeated sequence of the classification steps applied to each entry of a plurality of the entries from the captured data set.

16. The device of claim 14 wherein:
the evaluations include conditional expressions applied to one or more of the data items in the data entry; and
the conclusion is indicative of with an action or disposition of the data item based on the conditional expressions, further comprising:
the set of raw rules including a plurality of entries, each entry of the plurality of entries referencing at least one parameter, a conditional operation and a value for the parameter that results in the action or disposition called for by satisfying the conditional expression.

17. The device of claim 14 further comprising a filter table including an ordered list of rules based on the raw rules, each rule of the list of rules including a conditional expression based on at least one parameter and an action associated with the conditional expression.

18. The device of claim 17 further comprising:
a parameter or parameter value occurring in a plurality of the rules in the filter table; and
a general rule based on the plurality of the rules in the list of rules having the identified parameter or parameter value occurring in each rule of the plurality of the rules.

19. A computer program embodying program code on a non-transitory computer readable medium that, when executed by a processor, performs steps for implementing a method of classifying log messages into groups indicative of a message format, the method comprising:
capturing a set of raw rules resulting from inputs indicative of evaluations and conclusions of data classification operations, wherein each of the set of raw rules comprises an evaluation for a particular data item and a corresponding conclusion for determining successive privacy handling of the particular data item;
identifying patterns in the set of raw rules by consolidating duplicative conditions and eliminating inconsequential conditions;
applying a context to the rules based on a usage or domain of the data; and
anonymizing the data and combining with other sets of anonymized data.

20. The computer program product of claim 19, wherein capturing the set of raw rules further includes:
logging a sequence of classification steps performed on entries from a captured data set, the classification steps including designation of a privacy level for each entry from a plurality of the entries;
identifying a succession of the classification steps, the succession defining a repeated sequence of the classification steps applied to each entry of a plurality of the entries from the captured data set; and
classifying additional entries from other captured data sets by replaying the identified succession for designating the privacy level of the additional entries.

* * * * *